US012715015B2

(12) United States Patent
Zacharias

(10) Patent No.: US 12,715,015 B2
(45) Date of Patent: Aug. 25, 2026

(54) FOLDABLE WHEELED SPRINKLER CART

(71) Applicant: Jonah Zacharias, La Crete (CA)

(72) Inventor: Jonah Zacharias, La Crete (CA)

( * ) Notice: Subject to any disclaimer, the term of this patent is extended or adjusted under 35 U.S.C. 154(b) by 174 days.

(21) Appl. No.: 18/664,350

(22) Filed: May 15, 2024

(65) Prior Publication Data

US 2025/0214101 A1 Jul. 3, 2025

Related U.S. Application Data

(63) Continuation of application No. PCT/IB2024/050023, filed on Jan. 2, 2024.

(51) Int. Cl.
*B05B 15/68* (2018.01)

(52) U.S. Cl.
CPC .................................... *B05B 15/68* (2018.02)

(58) Field of Classification Search
CPC ...................................................... B05B 15/68
USPC .......................................................... 239/722
See application file for complete search history.

(56) References Cited

U.S. PATENT DOCUMENTS 2,694,600 A * 11/1954 Richey .................. B05B 15/625 239/723
4,428,434 A * 1/1984 Gelaude ................. A62C 35/00 239/70
4,824,020 A * 4/1989 Harward ............... B05B 15/625 248/188
5,836,516 A * 11/1998 Van Epps ............. B05B 15/625 239/281
6,322,027 B1 * 11/2001 Hsu ........................ F16M 11/34 248/188.7
2011/0132405 A1 * 6/2011 Lowenstein ........ E04D 13/0765 134/21
2012/0286075 A1 * 11/2012 Brueske ................ B05B 15/628 239/722
2013/0062080 A1 * 3/2013 Tobin ..................... A62C 31/28 169/46

(Continued)

FOREIGN PATENT DOCUMENTS

CN 207803047 U 4/2019

OTHER PUBLICATIONS

CN207803047U English by Google Patents (Year: 2017).*
International Search Report, PCT/IB2024050023, Apr. 9, 2024.
International Search Report, PCT/IB2024054716, Oct. 31, 2024.

*Primary Examiner* — Chee-Chong Lee
(74) *Attorney, Agent, or Firm* — Lewellyn Law, PLLC; Stephen Lewellyn

(57) ABSTRACT

A foldable wheeled sprinkler cart has a first water conduit having opposite first and seconds and a length extending therebetween. The first water conduit is bent at a position between its first and second ends thereby forming a horizontal first conduit section and a vertical second conduit section. A hose coupling is attached to the first end for securing a garden hose. A second water conduit has opposite first and second ends and a length extending therebetween a sprinkler head is attached to the second end. A sliding hinge connects the first and second water conduits. A coupling is configured to detachably connect the second end of the first conduit and the first end of the second conduit in a fluidically sealed connection. The cart further has a pair of wheels and a pair of wheel support legs, each pivotally attached at one end to the first conduit and having one wheel attached at its opposite end.

8 Claims, 9 Drawing Sheets

(56) References Cited

U.S. PATENT DOCUMENTS

2020/0360743 A1 11/2020 Bakhos

* cited by examiner

FOLDABLE WHEELED SPRINKLER CART

CROSS-REFERENCE TO RELATED APPLICATIONS

This application is a continuation of PCT/IB2024/050023, filed Jan. 2, 2024, the entirety of which is incorporated herein by reference.

FIELD OF THE INVENTION

The invention relates to lawn and garden sprinklers and, more particularly, to a foldable wheeled sprinkler cart.

BACKGROUND OF THE INVENTION

Various sprinklers and sprinkler systems for use in watering lawns and gardens have long been in use. Elevated sprinkler systems are useful because they can spray water over large areas. Elevated sprinkler systems existing up to now are heavy and difficult to move. Wheeled sprinkler systems are useful because they can be moved from location to location without having to be carried. Wheeled sprinkler systems existing up to now are unstable and tend to overturn when being moved.

Accordingly, there remains a need for a collapsible and portable water sprinkler system that is lightweight, easy to set up and use, and compact in configuration for ease of carrying and storage, and which does not tend to overturn when being moved.

SUMMARY OF THE INVENTION

Embodiments of the invention described herein provide for a foldable wheeled sprinkler cart that improves upon the now existing portable sprinkler systems.

An object of the embodiments of the invention is to provide an elevated and portable sprinkler system of simple design and increased ground stability.

Another object of the embodiments of the invention is to provide an elevated and portable sprinkler system having wheels and which can be moved from location to location by simply pulling upon a hose connected to the sprinkler system, thereby avoiding the need to walk upon recently watered area.

Another object of the embodiments of the invention is to provide an elevated and portable sprinkler system that has a compact storage configuration making the system easy to store, package, and ship.

In an embodiment, a foldable wheeled sprinkler cart has a first water conduit having opposite first and seconds and a length extending therebetween. The first water conduit is bent at a position between its first and second ends thereby forming a horizontal first conduit section and a vertical second conduit section. A hose coupling is attached to the first end for securing a garden hose. A second water conduit has opposite first and second ends and a length extending therebetween a sprinkler head is attached to the second end. A sliding hinge connects the first and second water conduits. A coupling is configured to detachably connect the second end of the first conduit and the first end of the second conduit in a fluidically sealed connection. The cart further has a pair of wheels and a pair of wheel support legs, each pivotally attached at one end to the first conduit and having one wheel attached at its opposite end. Further, the cart has an in-use configuration where the wheel support legs are pivoted away from the first conduit and the wheels together with the horizontal first section of the first conduit provide ground support to the cart.

In aspects, the foldable wheeled sprinkler cart may have a storage configuration where the wheel support legs are pivoted toward the first conduit and lay generally along the first conduit and where the second conduit is rotated toward the first conduit and lays generally along the first conduit.

Numerous additional objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be made to the accompanying drawings and descriptive matter in which there are illustrated embodiments of the invention.

BRIEF DESCRIPTION OF THE DRAWINGS

The following drawings illustrate by way of example and are included to provide a further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature or a feature with similar functionality. In the drawings.

DETAILED DESCRIPTION

Figure 1:
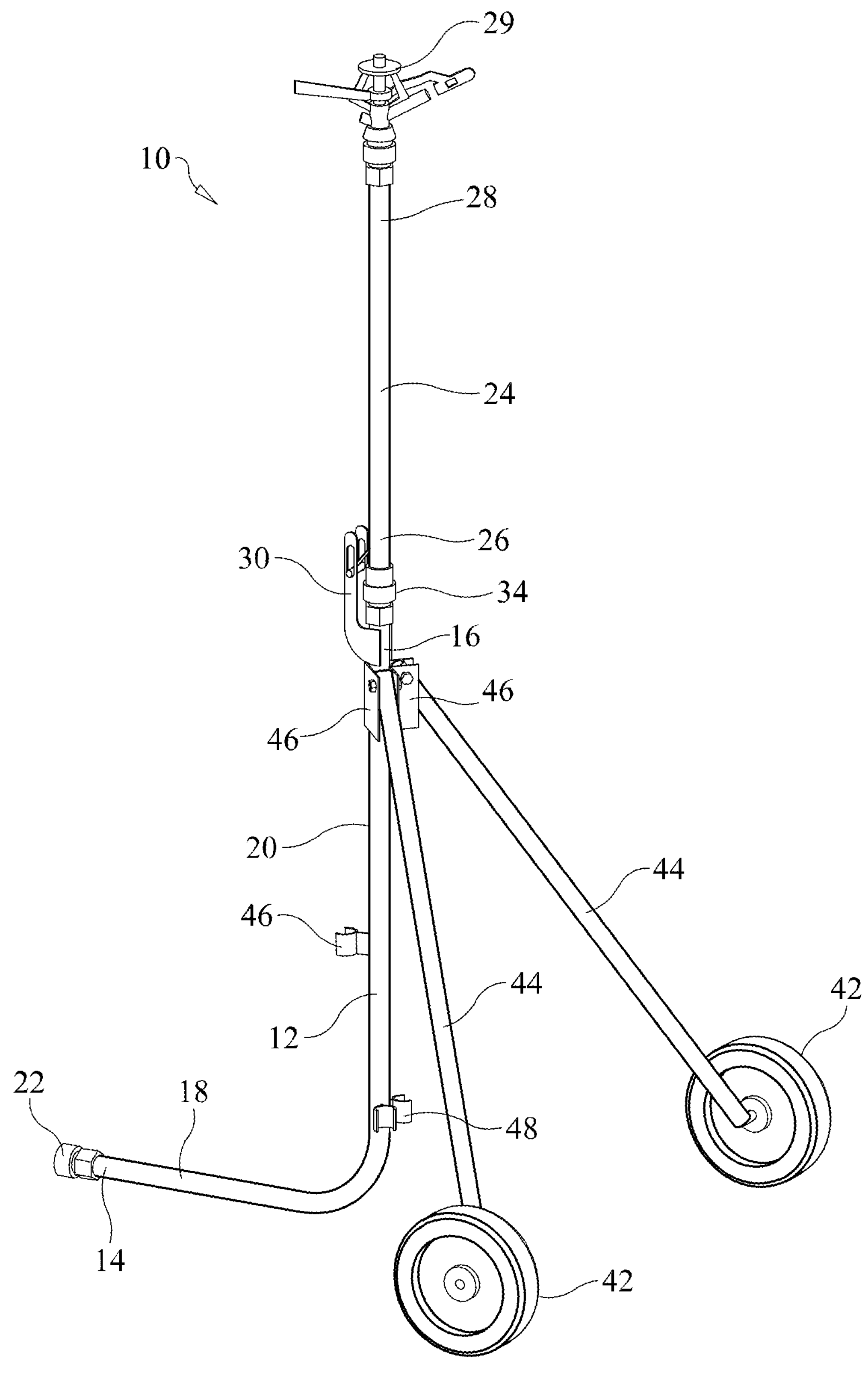
FIG. 1 is a first perspective view of a foldable wheeled sprinkler cart shown in accordance with an embodiment of the invention, and in an in-use, unfolded configuration.
Figure 2:
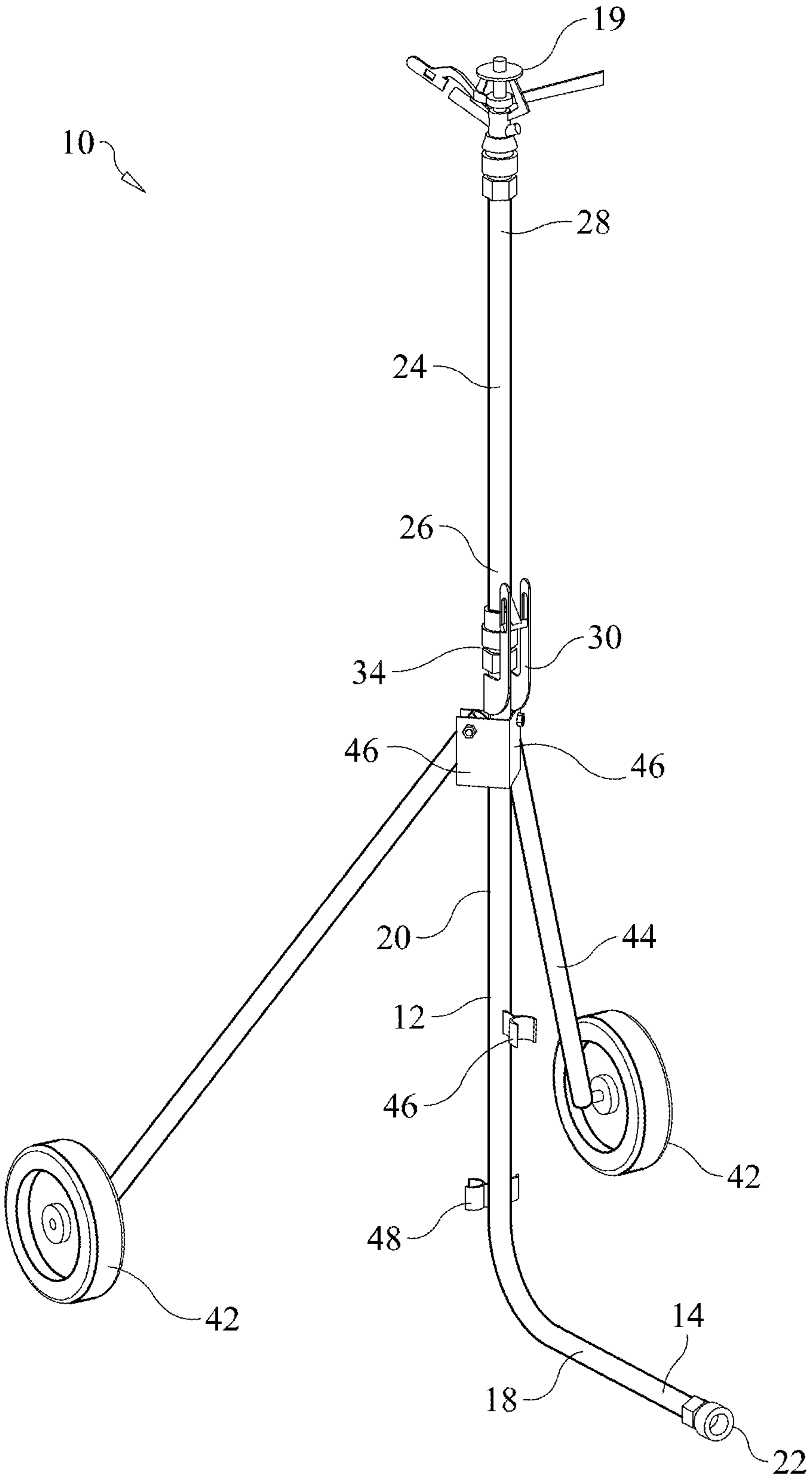
FIG. 2 is a second perspective view of a foldable wheeled sprinkler cart shown in accordance with an embodiment of the invention, and in an in-use, unfolded configuration.
Figure 3:
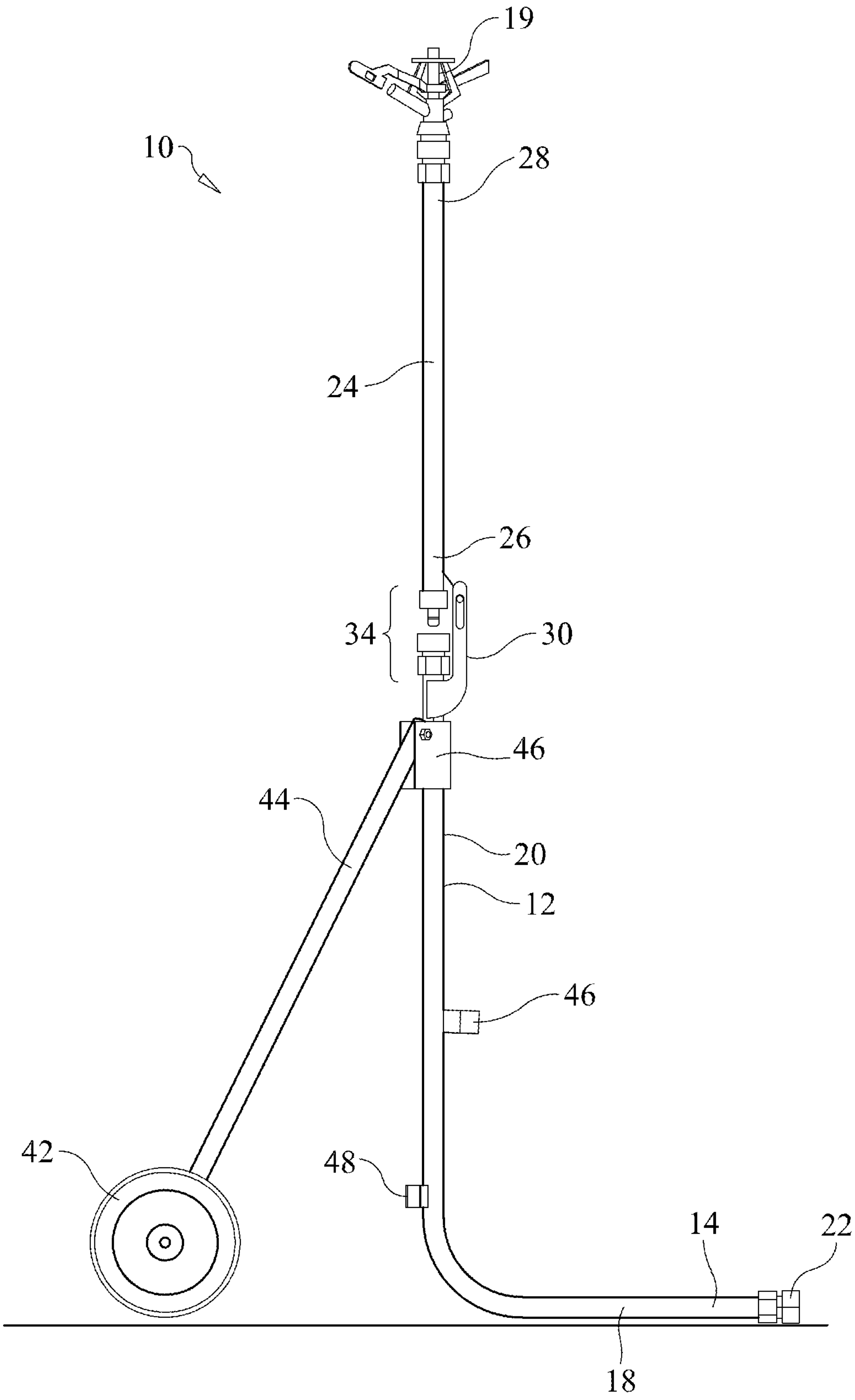
FIG. 3 is a side elevation view of a foldable wheeled sprinkler cart shown in accordance with an embodiment of the invention, and in an in-use, unfolded configuration.
Figure 4:
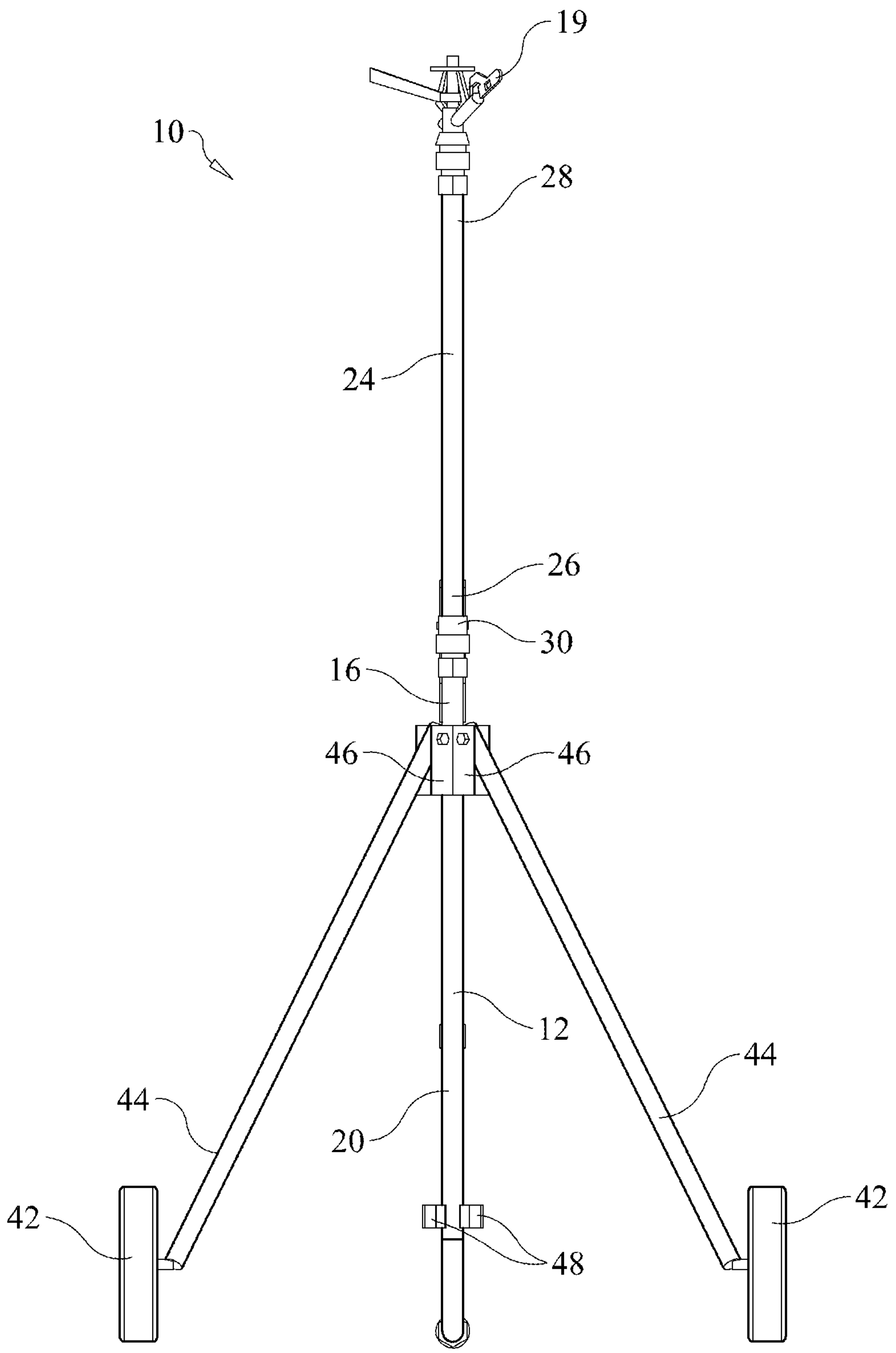
FIG. 4 is a back elevation view of a foldable wheeled sprinkler cart shown in accordance with an embodiment of the invention, and in an in-use, unfolded configuration.

The following detailed description of embodiments of the invention references the accompanying drawings. The embodiments are intended to describe aspects of the invention in sufficient detail to enable those skilled in the art to practice the invention. Other embodiments can be utilized, and changes can be made without departing from the scope of the disclosure.

In FIGS. 1-9 of the drawings, there is illustrated a foldable wheeled sprinkler cart 10 that is constructed in accordance with an embodiment of the invention. Cart 10 is useful in watering gardens, lawns, and the like. As explained below, cart 10 has an extended or in-use configuration and a folded or storage configuration. In the in-use configuration, seen in FIGS. 1 and 2, cart 10 is configured for watering and can be moved by pulling upon a water hosed connected to the cart without the cart tipping over. In the folded configuration, seen in FIGS. 7-9, cart 10 is compact which makes for easy storage or packaging and shipping.

In the illustrated embodiment, cart 10 has a first water conduit 12 having opposite ends 14 and 16. The first water conduit 12 is bent along its length providing a first section 18 and a second section 20. As shown, the first section 18 is disposed generally horizontal and has the first end 14, and the second section 20 is disposed generally vertical and has the second end 16. A hose coupling 22 or the like is attached to end 14 for connection to a water hose (not shown) to supply water.

Cart 10 has a second water conduit 24 with opposite ends 26 and 28. A sprinkler head 29 is attached to end 28. Sprinkler head 29 could be any desired sprinkler head capable of distributing water in a desired pattern for irrigation. In an aspect, the sprinkler head may be a 360-degree impact sprinkler head.

A quick coupling 34, having a first connector, such as female connector 34*a* and second connector, such as a male connector 34*b*, removably connects the first and second water conduits 12 and 14 at ends 16 and 26, respectively. While cart 10 is illustrated with the female connector attached to the first water conduit 12 and the male connector attached to the second water conduit, they could be reversed. Quick coupling 34 can be any type of coupling that is known and is used to detachably connect the ends of two water conduits together in a fluidically sealed connection.

Figure 5:
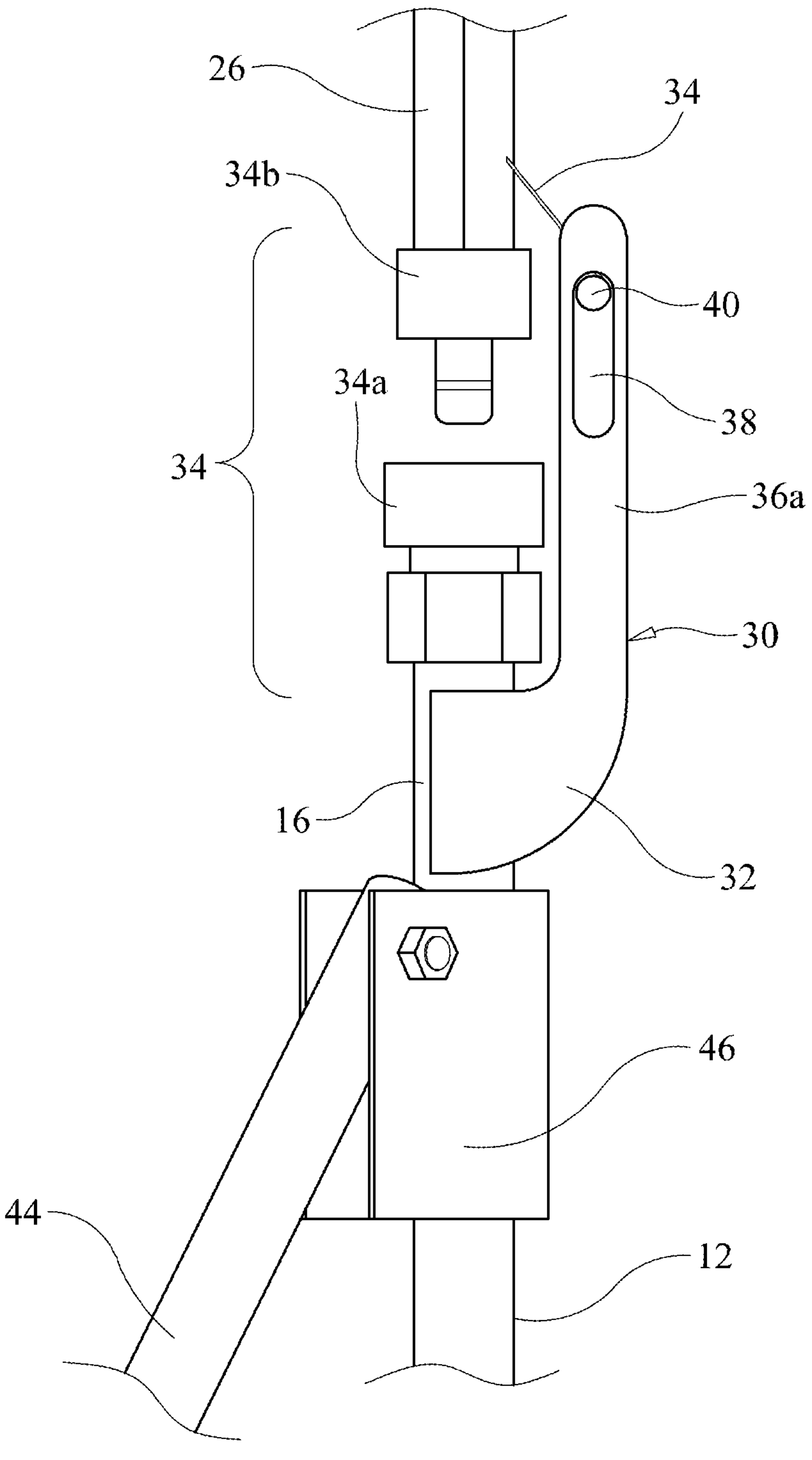
FIG. 5 is an enlarged, partial view of a foldable wheeled sprinkler cart shown in accordance with an embodiment of the invention.

Cart 10 may have a sliding hinge 30 that connects the first and second water conduits 12 and 24 and is configured to allow linear movement between the conduits such that ends 16 and 26 can be moved toward and away from one another to permit coupling and de-coupling via the coupling 34, as best seen in FIG. 5. Hinge 30 is also configured to allow the second conduit 24 to rotate or pivot in relation to the first conduit 12 such that the second conduit can be folded from the in-use position where it extends from the first conduit into a storage position where it runs generally along the first conduit for storage.

Figure 6:
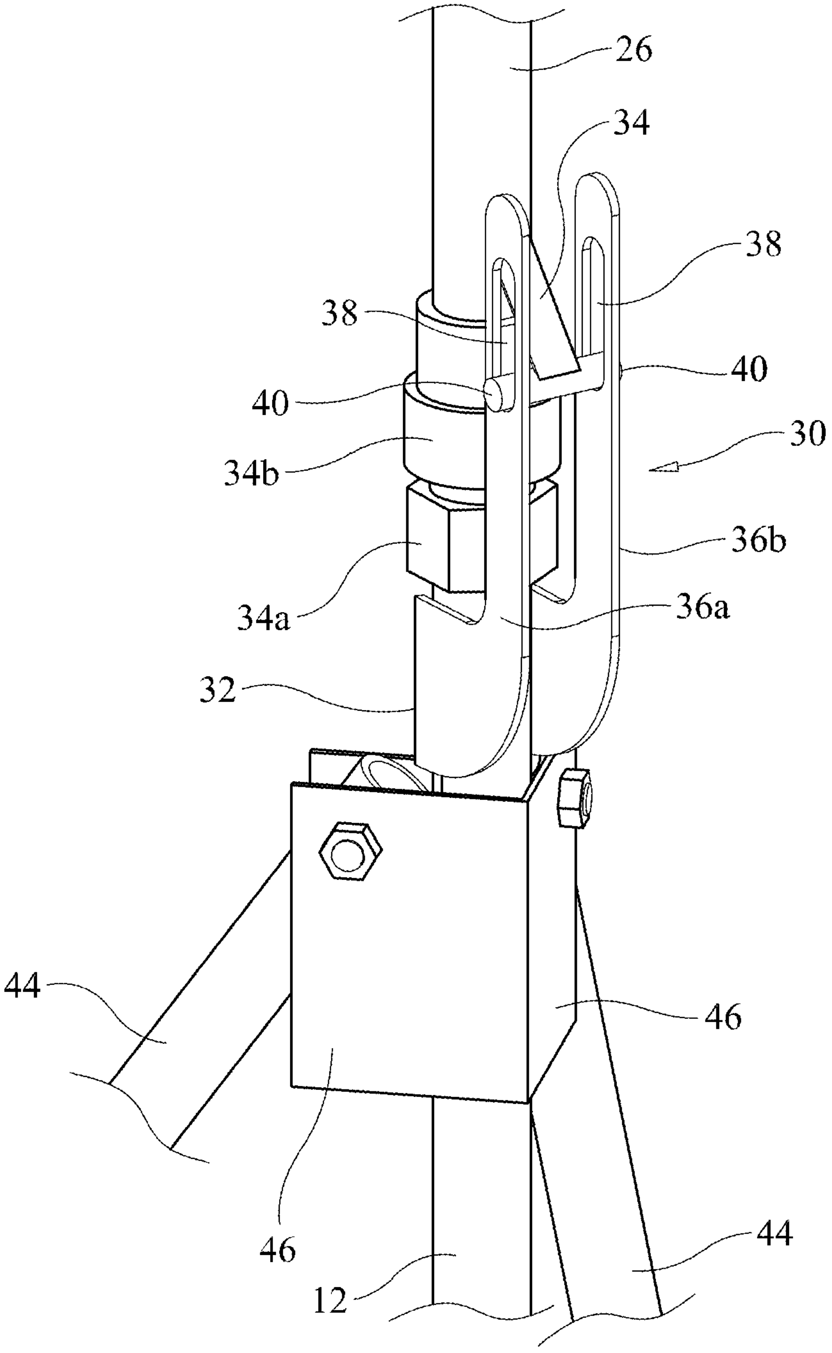
FIG. 6 is an enlarged, partial view of a foldable wheeled sprinkler cart shown in accordance with an embodiment of the invention.
Figure 7:
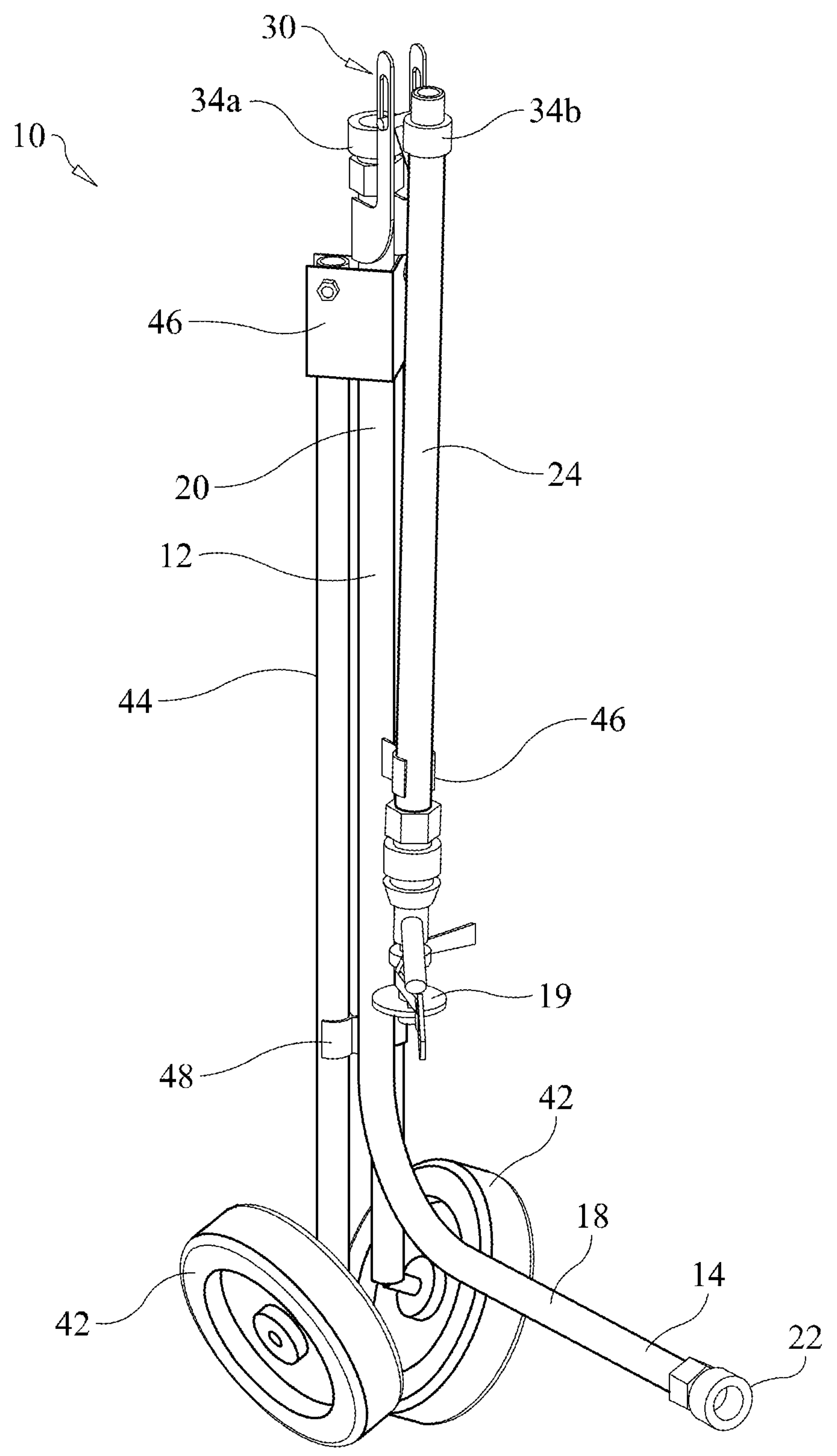
FIG. 7 is a perspective view of a foldable wheeled sprinkler cart shown in accordance with an embodiment of the invention, and in a folded, storage configuration.
Figure 8:
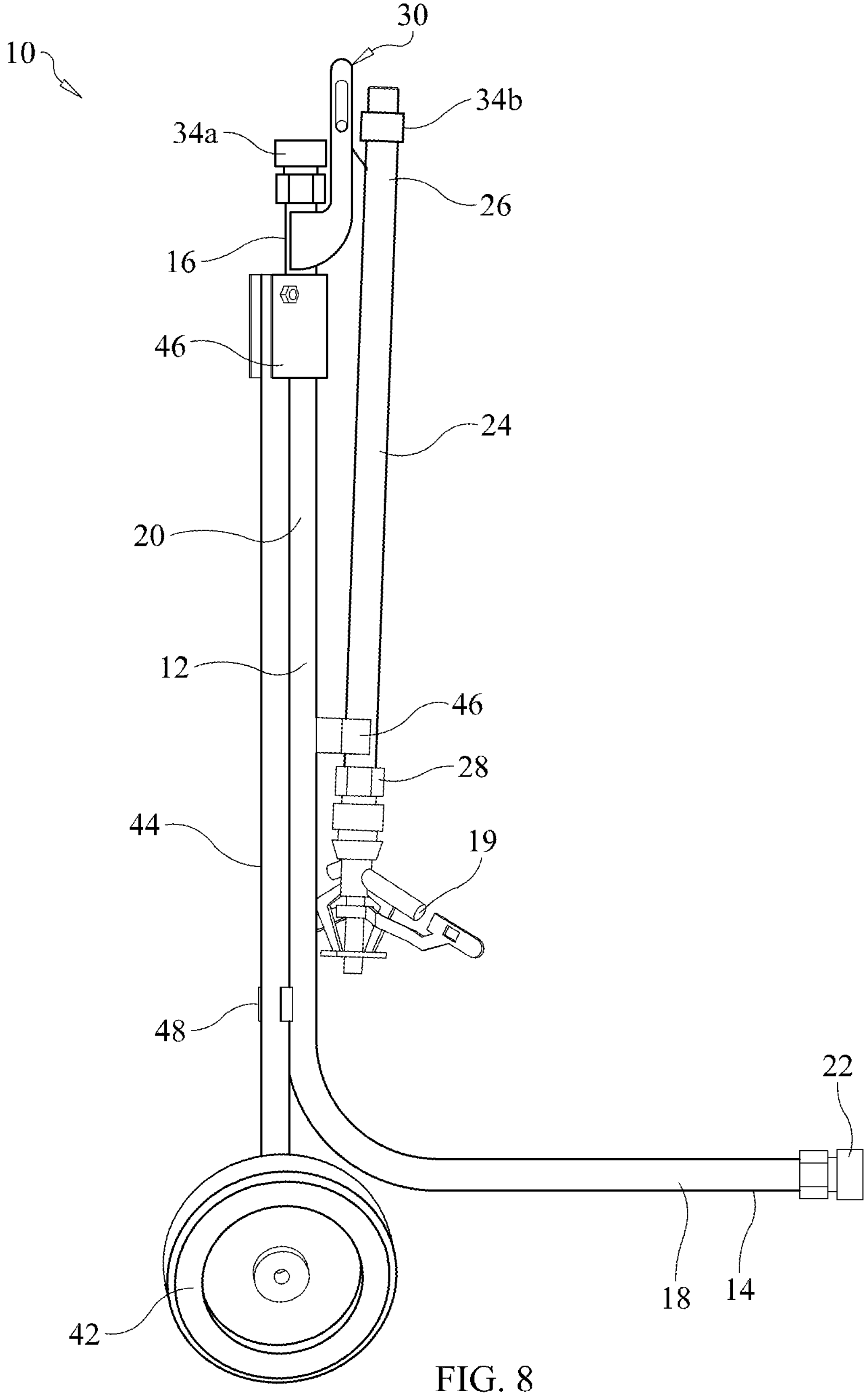
FIG. 8 is a side elevation view of a foldable wheeled sprinkler cart shown in accordance with an embodiment of the invention, and in a folded, storage configuration.
Figure 9:
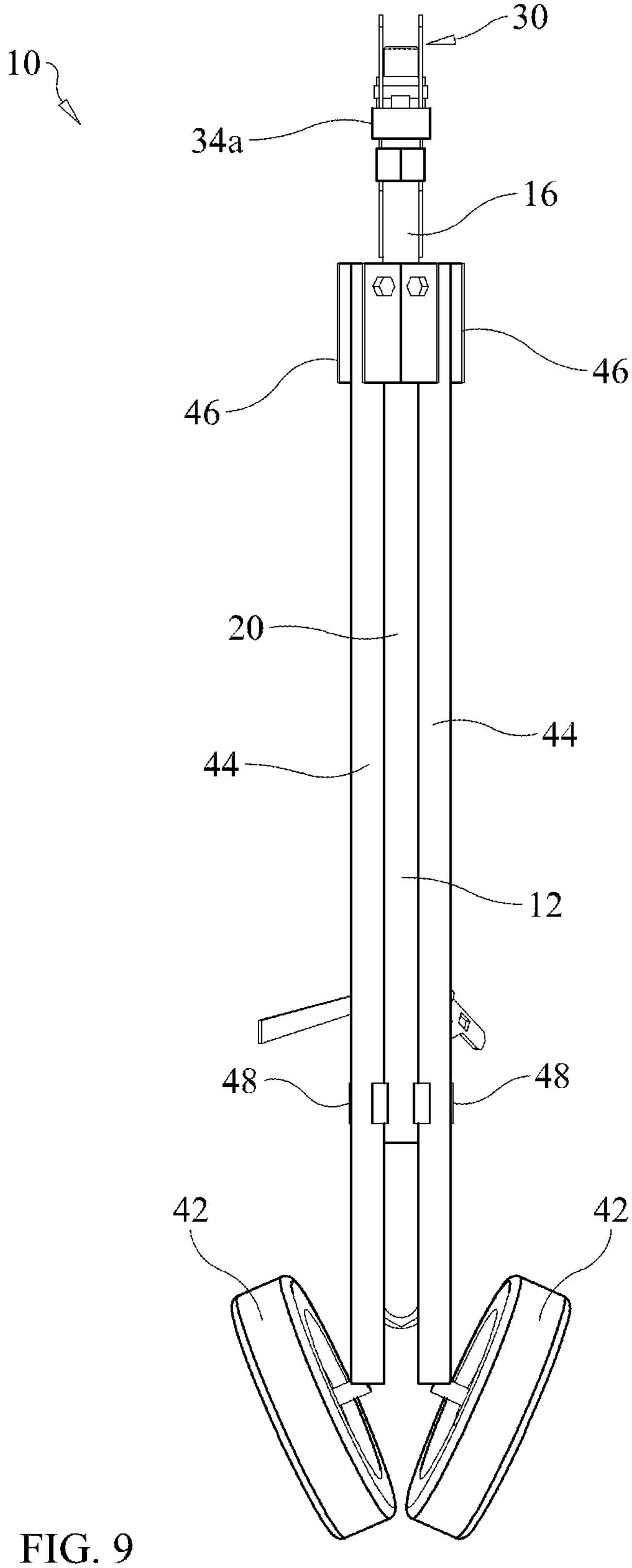
FIG. 9 is a back elevation view of a foldable wheeled sprinkler cart shown in accordance with an embodiment of the invention, and in a folded, storage configuration.

As best seen in FIG. 6, the sliding hinge 30 may have a first hinge part 32 that is fixedly attached to the first conduit 12 and a second hinge part 34 that is fixedly attached to the second conduit 24. The first hinge part 32 may have a pair of spaced, elongated members 36*a* and 36*b* that are disposed at opposite sides, each having an elongated slot 38 extending along its length. The second part 34 is located between the elongated members and has a pair of oppositely extending pins 40 that are slidably and pivotally disposed in slots 38.

Cart 10 may have wheels 42 for rolling support upon a ground surface. Each wheel 42 may be attached to the end of a respective folding leg member 44 with the opposite end of the leg member pivotally attached to the first conduit by a pivot coupling 46. Pivot couplings 46 permit the leg members 44 to pivot toward and away from the first conduit between the in-use configuration (FIG. 1) and the storage configuration (FIG. 7) wherein the leg members run generally against and along the first conduit. In the in-use configuration the leg members 44 and the attached wheels 42 together with the horizontal, first section 18 of the first conduit forming a tripod-like support upon a ground surface. Each leg member 44 has a length such that when the leg members are rotated away from the first conduit and into the in-use position, the wheels 44 are spaced horizontally from the vertical, second section 20 of the first conduit 12 a sufficient distance to prevent tipping.

Particularly, this configuration allows a user to pull on a hose (not shown) that is connected to the first conduit 12 by the hose coupling 22 and thus pull cart 10 along the ground surface. This ability may be desirable to permit relocating the cart 10 after irrigating an area without having to walk on the recently irrigated and wet area. For example, if an area is freshly seeded, it is undesirable to walk on the seeded area after being watered to remove or relocate the sprinkler cart.

Cart 10 may further have one or more clips for securing the second conduit 24 and each leg member 44 in the folded position against the first conduit. As representatively shown, cart 10 may have a clip 46 attached to the first conduit for removably holding the second conduit 24 in the folded position, and clips 48 attached to the first conduit for removably holding a respective leg member 44 in the folded position.

It will be appreciated by persons skilled in the art that the present embodiment is not limited to what has been particularly shown and described hereinabove. A variety of modifications and variations are possible in light of the above teachings without departing from the scope of the disclosure.

What is claimed is:

1. A foldable wheeled sprinkler cart comprising:

a first water conduit having opposite first and second ends and a length extending therebetween, the first water conduit bent at a position between its first and second ends thereby forming a first conduit section and a second conduit section, the first end having a hose coupling;

a second water conduit having opposite first and second ends and a length extending therebetween;

a sliding hinge connecting the first and second water conduits, the sliding hinge having a first hinge part connected to a second hinge part such the first and second hinge parts are rotatable with respect to one another and slidable with respect to one another providing a linear movement of the second conduit with respect to the first conduit so that the first end of the second conduit can be moved toward and away from the second end of the first conduit and providing a pivotal movement of the second conduit with respect to the first conduit;

a sprinkler head attached to the second end of the second conduit;

a coupling configured to detachably connect the second end of the first conduit and the first end of the second conduit in a fluidically sealed connection;

a pair of wheels;

a pair of wheel support legs pivotally attached to the first conduit, wherein each support leg of the pair of support legs has a respective one wheel of the pair of wheels attached thereto; and wherein the cart has an in-use configuration where the pair of wheel support legs are pivoted away from the first conduit and the pair of wheels and the first section of the first conduit support the cart on a ground surface, the pair of wheels providing rolling engagement with the ground surface and the first section of the first conduit providing sliding engagement with the ground surface.

2. The foldable wheeled sprinkler cart of claim 1, wherein the cart has a storage configuration where the pair of wheel support legs are pivoted toward the first conduit and lie generally along the first conduit and where the second conduit is rotated toward the first conduit and lies generally along an exterior of the first conduit.

3. The foldable wheeled sprinkler cart of claim 2, further comprising:

a first clip attached to the first conduit and configured to releasably hold the second conduit when in the storage configuration; and first and second wheel support leg clips, each configured to releasably hold a respective wheel support leg when in the storage configuration.

4. The foldable wheeled sprinkler cart of claim 1, wherein:

the first hinge part has a pair of spaced, elongated members each having a slot extending along its length; and the second hinge part being disposed between the elongated members and pivotally and slidably received in each slot.

5. The foldable wheeled sprinkler cart of claim 1, wherein the sprinkler head is a 360-degree impact type sprinkler head.

6. A foldable wheeled sprinkler cart comprising:

a first water conduit having opposite first and second ends and a length extending therebetween, the first water conduit bent at a position between its first and second ends thereby forming a first conduit section and a second conduit section, the first end having a hose coupling;

a second water conduit having opposite first and second ends and a length extending therebetween;

a sliding hinge connecting the first and second water conduits, the sliding hinge having a first hinge part connected to a second hinge part such the first and second hinge parts are rotatable with respect to one another and slidable with respect to one another providing a linear movement of the second conduit with respect to the first conduit so that the first end of the second conduit can be moved toward and away from the second end of the first conduit and providing a pivotal movement of the second conduit with respect to the first conduit;

a sprinkler head attached to the second end of the second conduit;

a coupling configured to detachably connect the second end of the first conduit and the first end of the second conduit in a fluidically sealed connection;

a pair of wheels;

a pair of wheel support legs pivotally attached to the first conduit, wherein each support leg of the pair of support legs has a respective one wheel of the pair of wheels attached thereto;

wherein the cart has an in-use configuration where the pair of wheel support legs are pivoted away from the first conduit and the pair of wheels and the first section of the first conduit support the cart on a ground surface, the pair of wheels providing rolling engagement with the ground surface and the first section of the first conduit providing sliding engagement with the ground surface; and wherein the cart has a storage configuration where the pair of wheel support legs are pivoted toward the first conduit and lie generally along the first conduit and where the second conduit is rotated toward the first conduit and lies generally along an exterior of the first conduit.

7. The foldable wheeled sprinkler cart of claim 6, wherein:

the first hinge part has a pair of spaced, elongated members each having a slot extending along its length; and the second hinge part being disposed between the elongated members and pivotally and slidably received in each slot.

8. The foldable wheeled sprinkler cart of claim 6, wherein the sprinkler head is a 360-degree impact sprinkler head.

* * * * *